Patented Sept. 5, 1933

1,925,225

UNITED STATES PATENT OFFICE 1,925,225

NEW INSECTICIDE MATERIAL

Robert B. Arnold, Richmond, Va., assignor to Tobacco By-Products and Chemical Corporation, Louisville, Ky., a corporation of Delaware No Drawing. Application August 11, 1932
Serial No. 628,371

5 Claims. (Cl. 167—24)

This invention relates to a new insecticide material which while having a general application for destruction of insects, is particularly advantageous for protecting deciduous fruit and deciduous trees from those insects which damage the fruit most severely, such, for example, as aphis, codling moth and curculio.

The principal object of the invention is to provide an insecticide material which will serve not only as a stomach poison but also as a contact poison and which will slowly evolve a toxic or asphyxiating emanation which for a relatively considerable time will be sufficiently concentrated at least to serve as an insect repellent, and in some cases, as an insecticide.

A further object is to provide such an insecticide as hereinbefore set forth which will, after the final evolution of its toxic or asphyxiating emanation, leave no residues which will be injurious to live stock or humans.

With these objects in view and others which will be obvious from the description hereinafter, the invention consists of an insecticide containing in effective form a product resulting from the reaction of commercial tannic acid with beta-pyridyl-alpha-piperidine or with its methyl compound. While the latter compounds, or either of them, may be made synthetically, at the present time they are more economically obtained from certain perennial weeds found growing in quantity in various countries, for example, in Northern Africa, Armenia, Russia and neighboring countries, the botanical name of the plant being *Chenopodiaceæ Anabasis aphylla*, L. From these plants, certain alkaloids are obtainable, these being known as anabasine alkaloids. These alkaloids include, principally, beta-pyridyl-alpha-piperidine and its methyl compound, both of which have high insecticidal properties and when combined with tannic acid do not lose their toxic effects. In view of the preponderance of the beta-pyridyl-alpha-piperidine in the anabasine alkaloids as obtained from the plant, it is not necessary in all cases to separate the various alkaloids before preparing the desired tannate, but the mixture of such alkaloids as obtained from the plant may be used instead of the pure beta-pyridyl-alpha-piperidine.

The important advantages of the insecticide whose essential toxic ingredient is beta-pyridyl-alpha-piperidine, or its methyl compound, or both, are that the tannic acid compound or compounds are relatively slowly soluble under usual atmospheric condition of moisture and the beta-pyridyl-alpha-piperidine, as well as its methyl compound, is given off from the tannate in vapor form at a rate which is not too rapid, but is sufficient to give such a concentration in ordinary air as to asphyxiate any insects which may rest on a leaf or fruit covered with the insecticide and to repel any insects flying close to it.

Of course, any soft bodied insects which are struck by a spray of the insecticide solution are killed and any chewing insects that eat any of the fruit or leaves which are coated with the insecticide will be poisoned. It is to be noted that any fruit protected by an ordinary insecticide, will be marred to the extent that the insect chews the fruit and thereby is poisoned. The great advantage of the new insecticide is that it is strongly repellent, due to its slow but sufficient evolution of toxic vapor or direct absorption by the soft body of a crawling insect, so that there is less reason to expect insects to attack fruit protected by it. While insecticides capable of evolving toxic vapors have been known before, they have so rapidly evolved their toxic vapors, that the protection lasted but a short time and, owing to the expense of spraying, it was not economically practical to spray often enough to maintain the desired protection of fruit. With the present insecticide material, unless heavy rains wash it from the fruit or plant, it can be expected to maintain a sufficient protective action for about three to four weeks.

Therefore, it is commercially practicable to employ the new insecticide as a spray material until the danger from insects has passed and yet have the fruit free from poison at picking time, so that all necessity for chemical treatment and washing to remove poisons is avoided.

Furthermore, any spray falling on the grass in those orchards which are not kept in clean cultivation, may be cropped by animals within three or four weeks after the application of the last spray without injurious results.

The insecticide material may be prepared by combining the anabasine alkaloids in their mixed and unpurified state, with tannic acid, prior to preparation of the spray itself, and may be packaged and marketed in this form, ready for admixture with water in the spray machine, or the mixing may be done at the time of use.

When making the tannic acid compound in advance of marketing and use, the ("free" or uncombined) anabasine alkaloids as supplied to the market are first analyzed to ascertain the percentage of beta-pyridyl-alpha-piperidine contained therein, and then combined with the tannic acid, as shown below. While any good technical grade of tannic acid may be employed, it has been found that a high grade of gall-nuts, such as Chinese gall-nuts, is particularly effective. The amount of tannic acid should be in excess of the theoretical amount necesary to form a tannate of all the beta-pyridyl-alpha-piperidine in the anabasine alkaloids. In practice an excess of about 10 percent of tannic acid should be present to insure that all the alkaloids have been combined and to leave a slight excess of tannic acid.

One desirable formula is as follows:

Anabasine alkaloids containing about 35 percent of beta-pyridyl-alpha-piperidine, 50 pounds,
Ground and sifted Chinese gall-nuts, 115 pounds.

Add the ground gall-nuts to about 50 gallons of water and stir for half an hour. Dilute the 50 pounds of anabasine alkaloids to about 25 gallons with water and pour or pump this solution into the 50 gallons containing the gall-nuts. Mix thoroughly. A voluminous precipitate of the tannates of the anabasine alkaloids will be formed, mixed with the insoluble portion of the gall-nuts. Filter, dry the solid residue at a low temperature and grind it to a finer powder.

Fill the powder into suitable receptacles, which may be of glass or tin but preferably of tin, and seal air tight.

The compound thus prepared will contain about 12 percent anabasine alkaloids by weight and may be shipped and stored for a reasonable length of time without appreciable deterioration. In use, the compound is added slowly to water in the tank of a sprayer or spray machine with constant stirring or agitation, which is continued while the spray is being applied. A suitable proportion is four pounds of the powder to 100 gallons of spray. Or, the compound may be used as an insecticide dust, by dusting on plants as it is, or diluted with an inert carrier such as powdered clay.

Instead of making the mixture of anabasine alkaloids and ground gall-nuts in advance of use in the spray, the anabasine alkaloids and the comminuted tannic acid compound, such as ground gall-nuts may be kept separate until the spray is being prepared. When employing this method of making the insecticide material simultaneously with the preparation of the spray, the water is supplied to the spray tank, then the tannic acid compound is added to the water gradually with continuous stirring and thereafter the anabasine alkaloid or mixture of alkaloids is added slowly with continued stirring. Thereafter, during the spraying the spray mixture should be kept agitated.

The spray solution should be proportioned to give a strength of about .05% to .06% of beta-pyridyl-alpha-piperidine, by weight, in the aqueous spray; the actual tannic acid required being about four times the weight or percentage of the alkaloid. Thus, in preparing the tank mixed formula from a 35 percent alkaloid solution the gall-nuts containing 60 percent tannic acid, the proportions would be one pound of the anabasine alkaloid solution, 2⅓ pounds of powdered gall-nuts, and 75 gallons of water.

What is claimed is:

1. An insecticide material comprising the reaction products of an anabasine alkaloid and tannic acid.

2. An insecticide material comprising a compound of beta-pyridyl-alpha-piperidine and tannic acid.

3. An insecticide material comprising a methyl compound of beta-pyridyl-alpha-piperidine and tannic acid.

4. An insecticide material comprising the reaction products of the mixture of anabasine alkaloids obtained from *Chenopodiaceæ Anabasis aphylla*, and a tannic acid compound.

5. An insecticide material comprising the reaction products of the mixture of anabasine alkaloids obtained from *Chenopodiaceæ Anabasis aphylla*, and Chinese gall-nuts.

ROBERT B. ARNOLD.